(12) United States Patent
Walsh et al.

(10) Patent No.: US 12,366,081 B2
(45) Date of Patent: *Jul. 22, 2025

(54) SYSTEM FOR VISUAL LIGHT COMMUNICATION AND RELATED METHODS

(71) Applicant: Elliptic Works LLC, Southampton, NY (US)

(72) Inventors: Sean Walsh, Westhampton, NY (US); John Bouvier, Westhampton, NY (US)

(73) Assignee: Elliptic Works LLC, Southampton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,734

(22) Filed: Mar. 4, 2024

(65) Prior Publication Data
US 2024/0200351 A1     Jun. 20, 2024

Related U.S. Application Data

(63) Continuation of application No. 18/076,170, filed on Dec. 6, 2022, now Pat. No. 11,920,367, which is a
(Continued)

(51) Int. Cl.
| | |
|---|---|
| H04B 10/00 | (2013.01) |
| E04H 4/12 | (2006.01) |
| G06V 20/40 | (2022.01) |
| G08B 21/08 | (2006.01) |
| G08C 17/02 | (2006.01) |

(Continued)

(52) U.S. Cl.
CPC ........... *E04H 4/1272* (2013.01); *G06V 20/41* (2022.01); *G08B 21/086* (2013.01); *G08C 17/02* (2013.01); *H02K 7/1823* (2013.01); *H04B 10/116* (2013.01); *H04B 13/02* (2013.01);
(Continued)

(58) Field of Classification Search
CPC ...... H04B 10/116; H04B 10/80; H04B 13/02; H04B 10/11; H04B 10/112; H04B 10/1123; H04B 10/1125; H04B 10/1127; H04B 10/1129; H04B 10/114; H04B 10/1143; H04B 10/1149; H04B 10/40
USPC ........ 398/104, 105, 172, 115, 118, 119, 127, 398/128, 129, 130, 131, 135, 136, 158,
(Continued)

(56) References Cited

U.S. PATENT DOCUMENTS

| | | |
|---|---|---|
| 4,033,871 A | 7/1977 | Wall |
| 4,823,367 A | 4/1989 | Kreutzfeld |

(Continued)

FOREIGN PATENT DOCUMENTS

| | | |
|---|---|---|
| DE | 19915212 | 4/1999 |
| DE | 102007053310 A1 | 6/2009 |

(Continued)

OTHER PUBLICATIONS

Officer M. Ayala Perriello, International Search Report and the Written Opinion, PCT/US2016/062597, Completed Apr. 25. 2017, 14 pp.
(Continued)

*Primary Examiner* — Hanh Phan
(74) *Attorney, Agent, or Firm* — Offit Kurman; Gregory A. Grissett

(57) ABSTRACT

A visual light communication system is disclosed.

38 Claims, 11 Drawing Sheets

Related U.S. Application Data continuation of application No. 17/470,489, filed on Sep. 9, 2021, now Pat. No. 11,525,274, which is a continuation of application No. 16/900,450, filed on Jun. 12, 2020, now Pat. No. 11,118,366, which is a continuation of application No. 16/063,023, filed as application No. PCT/US2016/062602 on Nov. 17, 2016, now Pat. No. 10,683,675.

(60) Provisional application No. 62/328,956, filed on Apr. 28, 2016, provisional application No. 62/256,466, filed on Nov. 17, 2015, provisional application No. 62/256,491, filed on Nov. 17, 2015, provisional application No. 62/256,458, filed on Nov. 17, 2015.

(51) Int. Cl.
*H02K 7/18* (2006.01)
*H04B 10/116* (2013.01)
*H04B 13/02* (2006.01)
*E04H 4/16* (2006.01)

(52) U.S. Cl.
CPC .......... *E04H 4/1236* (2013.01); *E04H 4/1245* (2013.01); *E04H 4/169* (2013.01)

(58) Field of Classification Search
USPC .......... 398/159, 33, 38, 25, 26, 27; 367/133, 367/131, 134; 307/111, 116, 118, 115
See application file for complete search history.

(56) References Cited

U.S. PATENT DOCUMENTS

| | | | |
|---|---|---|---|
| 5,730,861 A | 3/1998 | Sterghos et al. | |
| 6,047,192 A | 4/2000 | Maloney et al. | |
| 6,113,858 A | 9/2000 | Tang et al. | |
| 6,125,481 A | 10/2000 | Sicilano | |
| 6,175,308 B1 | 1/2001 | Tallman et al. | |
| 6,525,854 B1 | 2/2003 | Takahashi et al. | |
| 6,597,443 B2 | 7/2003 | Boman | |
| 6,603,865 B1 | 8/2003 | Yagi et al. | |
| 6,625,824 B1 | 9/2003 | Lutz et al. | |
| 6,747,367 B2 | 6/2004 | Cline et al. | |
| 6,865,347 B2 | 3/2005 | Perkins et al. | |
| 7,116,909 B2 | 10/2006 | Aburakawa et al. | |
| 7,222,047 B2 | 5/2007 | McMillan et al. | |
| 7,391,333 B2 | 6/2008 | Madden et al. | |
| 7,415,212 B2 | 8/2008 | Matsushita et al. | |
| 7,688,680 B1 | 3/2010 | Gunasekara et al. | |
| 8,494,218 B2 | 7/2013 | Chen et al. | |
| 8,515,880 B2 | 8/2013 | Holley et al. | |
| 8,659,435 B2 | 2/2014 | McKinney | |
| 9,080,985 B2 | 7/2015 | Stevenson et al. | |
| 9,250,626 B2 | 2/2016 | Michelon | |
| 9,261,462 B2 | 2/2016 | Clark | |
| 9,294,201 B2* | 3/2016 | Farr | H04B 10/80 |
| 10,167,650 B2 | 1/2019 | Torem et al. | |
| 10,683,675 B2* | 6/2020 | Walsh | G08B 21/086 |
| 11,118,366 B2* | 9/2021 | Walsh | E04H 4/1272 |
| 11,525,274 B2* | 12/2022 | Walsh | H02K 7/1823 |
| 11,920,367 B2* | 3/2024 | Walsh | H02K 7/1823 |
| 2005/0077190 A1 | 4/2005 | Djordjevic | |
| 2007/0183782 A1 | 8/2007 | Farr et al. | |
| 2007/0251461 A1 | 11/2007 | Reichard et al. | |
| 2008/0136191 A1 | 6/2008 | Baarman et al. | |
| 2008/0205892 A1 | 8/2008 | Baiden | |
| 2009/0040027 A1 | 2/2009 | Nakao | |
| 2009/0095096 A1 | 4/2009 | Dean et al. | |
| 2009/0134623 A1 | 5/2009 | Krouse | |
| 2009/0139456 A1 | 6/2009 | Lin | |
| 2010/0135651 A1 | 6/2010 | Tiraby | |
| 2010/0300548 A1 | 12/2010 | DeVerse | |
| 2011/0221197 A1 | 9/2011 | Peleg | |
| 2013/0104321 A1 | 5/2013 | Michelon | |
| 2013/0110319 A1 | 5/2013 | Michelon | |
| 2014/0103662 A1 | 4/2014 | Tosi | |
| 2014/0127742 A1 | 5/2014 | Field | |
| 2014/0303810 A1 | 10/2014 | van der Meijden et al. | |
| 2014/0308042 A1* | 10/2014 | Woo | H04B 10/2575 398/104 |
| 2014/0343728 A1 | 11/2014 | Jun et al. | |
| 2014/0363166 A1 | 12/2014 | Lacovara | |
| 2018/0371778 A1 | 12/2018 | Walsh et al. | |
| 2019/0338546 A1 | 11/2019 | Witelson et al. | |
| 2020/0308857 A1 | 10/2020 | Walsh et al. | |
| 2021/0404201 A1 | 12/2021 | Walsh et al. | |
| 2023/0095602 A1 | 3/2023 | Walsh et al. | |

FOREIGN PATENT DOCUMENTS

| | | |
|---|---|---|
| EP | 1429479 A1 | 6/2004 |
| EP | 2145409 A1 | 3/2014 |
| EP | 3282072 B1 | 6/2019 |
| EP | 3521532 B1 | 6/2021 |
| FR | 2968150 A1 | 12/2012 |
| JP | 2003164136 A | 6/2003 |
| JP | 2015050892 A | 3/2015 |
| WO | 200703227 A1 | 3/2007 |
| WO | 2014168918 A1 | 10/2014 |
| WO | 2017046808 A1 | 3/2017 |
| WO | 2017087712 A1 | 5/2017 |
| WO | 2017087716 A1 | 5/2017 |

OTHER PUBLICATIONS

Officer Kihwan Moon, International Preliminary Report on Patentability, PCT/US2016/062597, Issued May 22, 2018, 9 pp.
Officer E. Rolan Cisneros, International Search Report and the Written Opinion, PCT/US2016/062602, Completed Apr. 13, 2017 16 pp.
Officer Xiaofan Tang, International Preliminary Report on Patentability, PCT/US2016/062602, Issued May 22, 2018, 11 pp.

* cited by examiner

SYSTEM FOR VISUAL LIGHT COMMUNICATION AND RELATED METHODS

CROSS-REFERENCE TO RELATED APPLICATIONS

This application is a continuation application of U.S. application Ser. No. 18/076,170, filed Dec. 6, 2022, which is a continuation of U.S. application Ser. No. 17/470,489, filed Sep. 9, 2021, issued on Dec. 13, 2022 as U.S. Pat. No. 11,525,274, which is a continuation of U.S. application Ser. No. 16/900,450, filed Jun. 12, 2020, issued Sep. 14, 2021 as U.S. Pat. No. 11,118,366, which is a continuation of U.S. application Ser. No. 16/063,023, filed Jun. 15, 2018, issued Jun. 16, 2020 as U.S. Pat. No. 10,683,675, which is a national phase application under 35 U.S.C. § 371 and claims the benefit of and priority to PCT Application No. PCT/US2016/062602, filed Nov. 17, 2016, which claims priority to U.S. Provisional Application No. 62/328,956, filed Apr. 28, 2016, U.S. Provisional Application No. 62/256,458, filed Nov. 17, 2015, U.S. Provisional Application No. 62/256,466, filed Nov. 17, 2015, and U.S. Provisional Application No. 62/256,491, filed Nov. 17, 2015, the entire disclosures of which are incorporated by reference into this application for all purposes.

TECHNICAL FIELD

The present disclosure relates to a system to monitor and control operation of a pool system including pool components, and in particular to such a system that includes a visual light communication system.

BACKGROUND

Visual light communication (VLC) is a data communication medium that uses visible light between 400 THz (780 nm) and 800 THz (375 nm) as an optical carrier for data transmission and illumination. It uses fast pulses of light to transmit information. Light emitting diodes (LEDs) are one type of light that can be used in VLC. LEDs can be turned on and off quickly and perceived as a continuous beam of light. This is because the reaction time of the typical LED is less than 1 microsecond, which cannot be detected by the human eye. The change from an "on" state to an "off" state in high frequencies enables data transmission. "On" states and "off" states (represented as "1" and "0" respectively) can be encoded as data. Signal processing can be used to process that encoded data into information useable in a variety of contexts.

SUMMARY

An embodiment of the present disclosure is a visual light communication (VLC) system. The VLC system includes a light transmitter that is is configured to repeatedly transition between an on configuration where light is produced and an off configuration where no light is produced in order to generate a light signal that passes through the water. The transmitted light signal has encoded therein information concerning a pool component. The system also includes a light sensor operable within the water to receive a transmitted light signal. The light sensor is configured to convert the transmitted light signal into an electronic signal.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

There is need to send, receive, process, and contextualize data related to pools.

Embodiments of the present disclosure include systems, devices, methods, and software that enable the collection, processing, transmission of information related to various components of a pool system, as water pool water chemistry, flow rates along return lines, pump pressure, etc. It is desirable if this communication system can operate at least in part without hard wiring various sensors and communication components together while still permitting initiate and transmit commands to control various parameters of the pool, such as water circulation, lighting, and chemical balancing, as well as range of other pool and spa system components.

Figure 1:
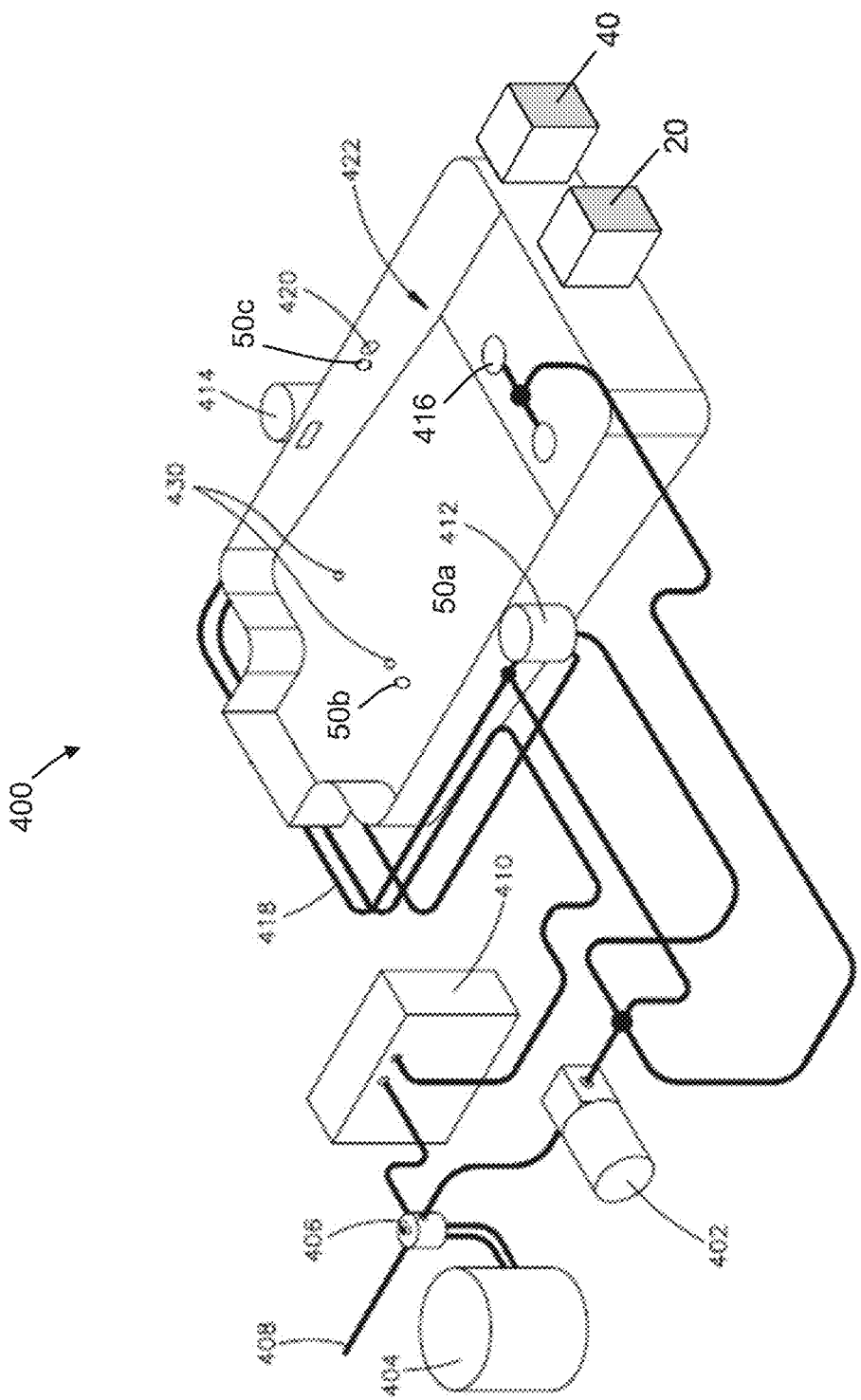
FIG. 1 is a schematic of a pool system according to an embodiment of the present disclosure.

FIG. 1 illustrates a pool system 400 that includes a pump 402, a filter 404, and a valve 406 where conduits from the drain 408 and heater 410 meet. The pool system 400 includes skimmers 412 and 414, a main drain 416, and a plurality of return lines 418 that terminate at returns 420 or return jets. The pump 402 will pull water from the pool 422 through a skimmer 412, 414 or main drain 416. The water is passed through a filter 404, and then filtered water is returned to the pool 422 under pressure through returns 420 and 430 that control flow direction and flow rate. Returns are also referred to as pool jets and are generally mounted on the pool wall below the surface. The return can include pop-up cleaning heads 430 as needed. The water is returned to the pool 422 through the pool jets 420 to create circulation and mixing of the pool water. The pool system may a computing device 20, a communications hub 40, and one or more communication assemblies 50a, 50b, 50c for sending and receiving data concerning the pool 422 and its components.

Figure 2:
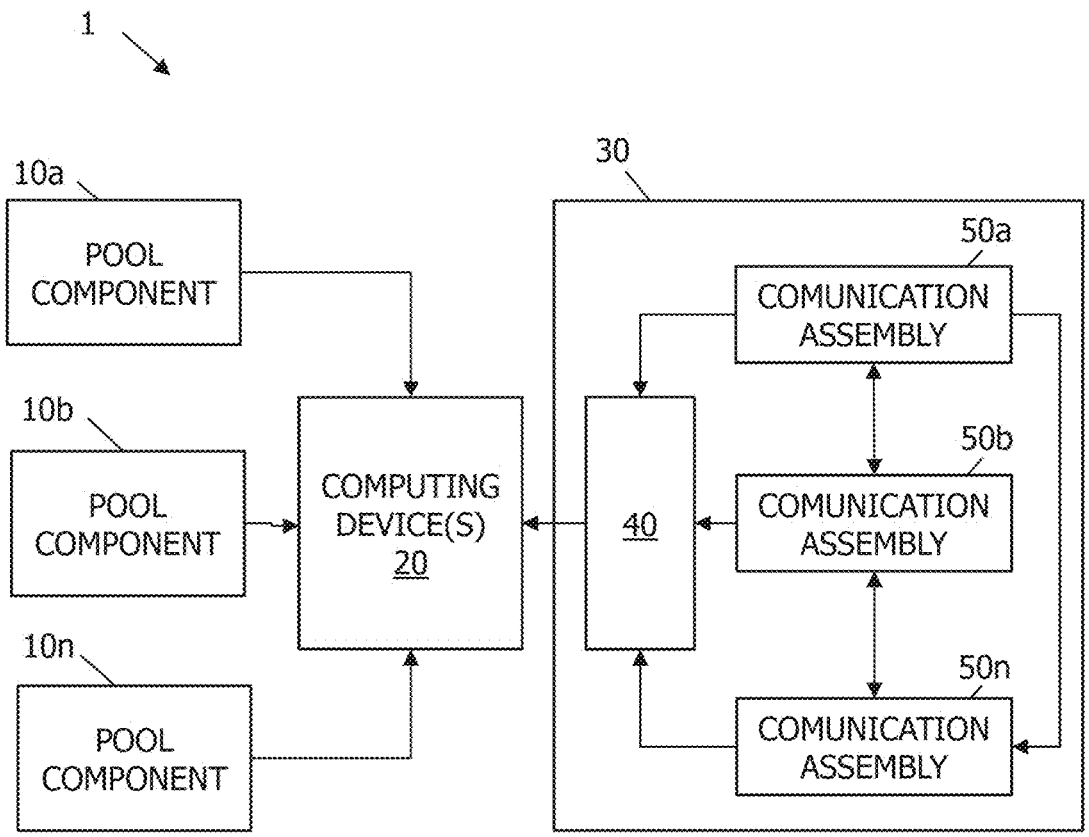
FIG. 2 is a schematic diagram of a system for control and monitoring of the pool system shown in FIG. 1.

FIG. 2 illustrates a system 1 for monitoring and controlling operation of the pool system 400. The system 1 includes a plurality of pool components 10a, 10b, . . . , 10n, a computing device 20, a communications system 30 that is in electronic communication with the computing device 20. In some embodiments, the system 1 may include a plurality of sensors (not shown) coupled to the communications system 30.

The pool components 10a-10n represent any pool component of a pool system as described above and illustrated in FIG. 1. A pool component may be a pump, valves, heater, drain, return lines, pool water, filters, skimmers, pop-up cleaning heads, pool jets, metering device, etc. Each pool component 10a, 10b, . . . 10n may be in electronic communication with the computing device 20.

Figure 3:
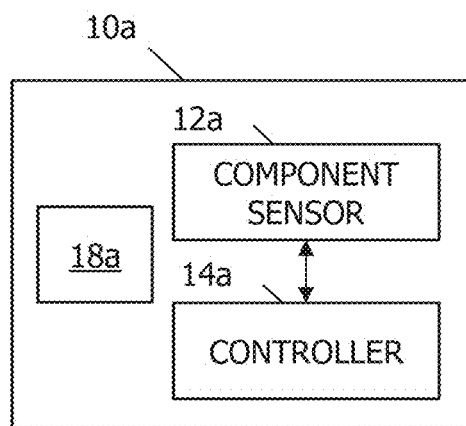
FIG. 3 is a schematic diagram of a pool component of the pool system shown in FIGS. 1 and 2.

FIG. 3 shows schematic diagram of an exemplary pool component 10a. Pool component 10a may include a component sensor 12a, a controller 14a electronically coupled to the sensor 12a, and a send-receive unit 18a electronically coupled to the controller 14a. The component sensor 12a may monitor the pool component and/or obtain pool data from proximate the pool component. The component sensor 12a may communicate with the controller 14a. The communication may be through a physical connection or through a visual light communication, wireless connection, or optionally a wired connection when appropriate. In some embodiments, pool component 10a may include a plurality of component sensors 12a, controllers 14a, and/or send-receive units 18a. In some embodiments, a component sensor 12a may communicate with only one controller 14a, while in alternate embodiments, a component sensor 12a may communicate with a plurality of controllers 14a. Similarly, in some embodiments controller 14a may communicate with only one component sensor 12a, while in other embodiments, controller 14a may communicate with a plurality of component sensors 12a.

The communications system 30 may include a communication hub 40 and a plurality of communication assemblies 50a-50n. Each communication assembly 50a-50n is electronically connected to the communication hub 40. The communication hub 40 may be electronically connected to the computing device 20 (or multiple computing devices 20). The electronic connection may be a physical connection (e.g. a wire) or it may be a wireless connection (e.g. Wi-Fi, Bluetooth, near field communication, optical, sound, ultrasound, or another wireless connection), or via visual light communication system.

The communications hub 40 can be any device that connects to a) pool components in the pool system, b) the VLC assemblies, and c) the computing device(s) 20. The communication hub 40 may be a send-receive device that transmits data received from each communication assembly 50a-50n to computing device 20. In some instances, the communication hub 40 may be a component of the computing device 20 such that the computing device 20 receives the pool data from the communication assemblies 50a-50n. The communication assemblies 50a-50n may be submerged in water and transmits data among the assemblies and to the communications hub 40. The communications hub 40 may be hard-wired or wirelessly connected to the computing device 20. The communication hub 40 allows a user to connect to the pool components, monitor the status of the pool components, and control their operation. A user or pool owner can communicate with pool components of a pool system directly or indirectly via computing device 20. This allows the user or pool owner to control individual pool components by connecting to them directly via the computing device and the VLC assemblies. A user can connect to individual components through the communications hub 40 (FIG. 4B), which can be in the form of a central hub. The communication hub can be accessed when the user is in proximity to the pool system. Alternatively, the user can access the communication hub from a remote location. Access to the communication hub is possible via the computing device. Alternatively, the user can access the components of the VLC system associated with the pool components when the user is in proximity to the pool system.

Figure 4A:
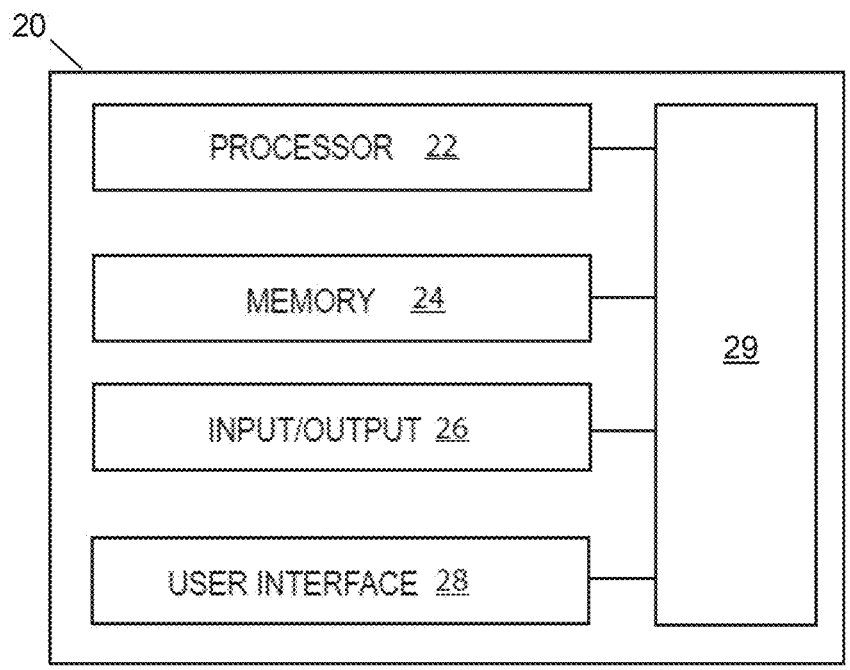
FIG. 4A is a schematic diagram of computing device according to an embodiment of the present disclosure.
Figure 4B:
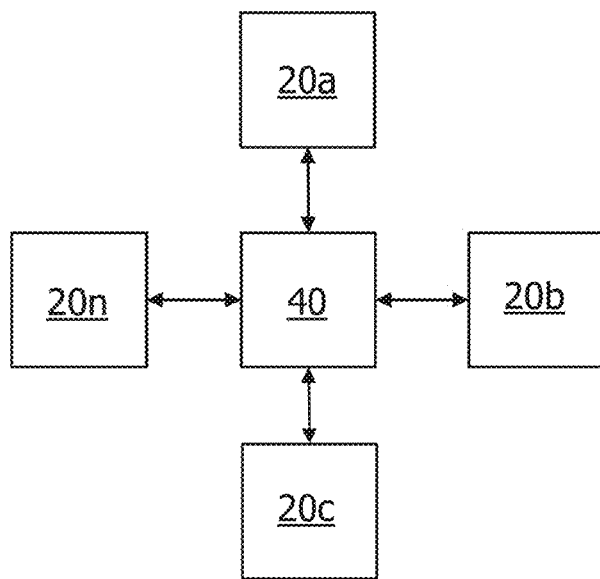
FIG. 4B illustrates a plurality of computing devices networked to communication with the system shown in FIGS. 1 and 2.

Referring to FIG. 4A, the system 1 may include one computing device 20 and a communications system 30. FIGS. 4A and 4B illustrate one computing device 20. However, multiple computing devices 20a, 20b, 20c . . . 20n may linked to the communications system 30, as illustrated in FIG. 4B. For purposes of clarifying how the software application is implemented across the various computing devices, reference number 20 is used interchangeably with reference numbers 20a, 20b, 20c . . . , 20n unless noted otherwise. In addition, the present disclosure describes software applications implemented over system components and configured to execute various steps in the methods and techniques described below. It should be appreciated that a software application can implement steps in the methods utilizing all of the system components or just portions of the system components. Furthermore, the software applications are described below in singular form. It should be appreciated that multiple software applications may interface to perform the described functions, and multiple applications can run on more than one computing device to implement the methodologies described herein.

Turning to FIG. 4A, the computing device 20 is configured to receive, process, and store various information used to implement one or more software applications, such as software application 29. The software application 29 may include native instructions for operation of the computing device 20 and instructions for implementing one or more of the methods described below. The hardware components of computing device 20 can include any appropriate device, examples of which include a portable computing device, such as a laptop, tablet or smart phone, or other computing devices, such as a desktop computing device or a server-computing device.

As illustrated in FIG. 4A, the computing device 20 includes one or more processor 22, a memory 24, input/output elements 26, and a user interface (UI) 28. It is emphasized that the operation diagram depiction of the computing device 20 is exemplary and is not intended to imply a specific implementation and/or configuration. The processor 22, memory 24, input/output portion 26, and user interface 28 can be coupled together to allow communications therebetween and can interface with the software application 29. The software application 29 may include an application programmatic interface (API).

Continuing with FIG. 4A, the memory 24 can be volatile (such as some types of RAM), non-volatile (such as ROM, flash memory, etc.), or a combination thereof, depending upon the exact configuration and type of processor 22. The computing device 20 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, or any other medium which can be used to store information and which can be accessed by the computing device 20.

Continuing with FIG. 4A, in various embodiments, the input/output portion 26 includes an antenna, lead or trace, electronic connector for wired connection, or a combination thereof. In some implementations, input/output portion 26 can include a receiver and transmitter, transceiver or transmitter-receiver. The input/output portion 26 is capable of receiving and/or providing information concerning components of the pool system. Furthermore, the input/output portion 26 is capable of receiving and/or providing information pertaining to communication with a network such as, for example, the Internet. As should be appreciated, transmit and receive functionality may also be provided by one or more devices external to computing device 20.

Referring to FIG. 4A, the user interface 28, which can include an input device and/or display (input device and display not shown) that allows a user to communicate with the or provide input instructions to the computing device 20. The user interface 28 can include inputs that provide the ability to control the computing device 12, via, for example, buttons, soft keys, a mouse, voice actuated controls, a touch screen, visual cues (e.g., moving a hand in front of a camera), or the like. The user interface 28 can provide outputs, including visual displays of the data obtained with the detection unit 18. Other outputs can include audio information (e.g., via speaker), mechanically (e.g., via a vibrating mechanism), or a combination thereof. In various configurations, the user interface 28 can include a display, a touch screen, a keyboard, a mouse, an accelerometer, a motion detector, a speaker, a microphone, a camera, or any combination thereof. The user interface 28 can further include any suitable device for inputting biometric information, such as, for example, fingerprint information, retinal information, voice information, and/or facial characteristic information, for instance, so as to require specific biometric information for access to the computing device 20. It should be appreciated that the computer devices can operate via any suitable operating system, such as Android, BSD, iOS, Linux, OS X, QNX, Microsoft Windows, Windows Phone, and IBM z/OS. Furthermore, the software application can operate with any of the aforementioned operation systems.

Continuing with reference to FIG. 4B, the system is implemented via exemplary architecture that includes computing devices 20a, 20b, 20c . . . , 20n in electronic communication with each other via a common communications network, such as, for example the Internet. The computing devices 20a-20n may be connected to a communications hub 40 as further explained below. The computing devices 20a, 20b, 20c . . . 20n may be arranged in a client-server architecture. The computing device 20a can receive and transmit data to other computing devices 20b, 20c, . . . 20n. In addition, one up to all the computing devices can receive information from the other computing devices. Furthermore, one or all of the computing devices can access information on the other computing devices. "Access" or "accessing" as used herein can include retrieving information stored in memory on a computing device. For instance, "access" or "accessing" includes sending instructions via the network to computing device 20a so as to cause information to be transmitted to the memory of the computing device 20b for access locally by the computing device 20b. In addition or alternatively, "access" or "accessing" can include the sending of an instruction to/from one computing device to access information stored in the memory on another computing device.

FIG. 4B illustrates a client-server network. However, the software application(s) can be implemented over any number of network configurations. For example, in alternate embodiments, the computing devices 20a, 20b, 20c . . . 20n are configured as a peer-to-peer network architecture. In still other alternative embodiments, the computing devices 20a, 20b, 20c . . . 20n can be arranged in a ring-type network architecture. Further, the software applications can be implemented across computing devices arranged on a network that includes aspects of a client-server network, peer-to-peer network, ring-type network, and/or other network architectures known to a person of ordinary skill in the art. Accordingly, it should be appreciated that numerous suitable alternative communication architectures are envisioned.

Figure 5:
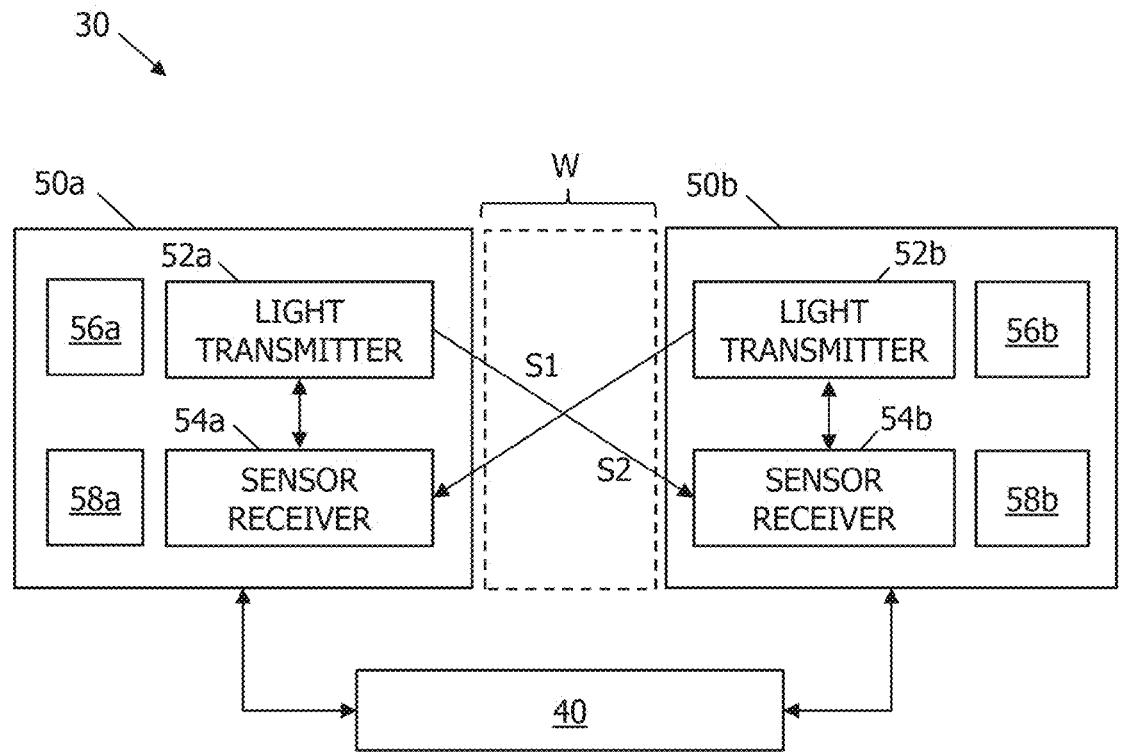
FIG. 5 is a schematic diagram of VLC communication assemblies in the system shown in FIG. 2.

FIG. 5 shows an embodiment communication system 30 implemented using visual light communication assemblies 50a and 50b. The communication system 30 includes a first visual light communication (VLC) assembly 50a and a second visual light communication (VLC) assembly 50b positioned across a water gap W. The first visual light communication (VLC) assembly 50a includes a light transmitter 52a, a light sensor-receiver 54a, a communication assembly controller 56a, and a power source 58a. The light transmitter 52a may communicate with a sensor receiver 54a in the first VLC assembly 50a and with a sensor-receiver 54b in the second VLC assembly 50b.

The light transmitter 52a can be an LED on one side of a water gap W and the sensor-receiver 54b can be a photo diode on the other side of a water gap W. The light transmitter 52a is configured to repeatedly transition between an on configuration where a light is produced and an off configuration where no light is produced. The repeated transitions between the on and off configurations generate a transmitted light signal having encoded therein information concerning a pool component of a pool system. The sensor-receiver 54a is configured to receive the transmitted light signal from a different transmitter.

In accordance with the illustrated embodiment, the light transmitter 52a can be a high-brightness white LED. The sensor-receiver 54a can be a silicon photodiode that is responsive to a visible wavelength. The sensor-receiver is configured to function as a receiving element. Embodiments of the present disclosure allow for using mixtures of red, green, and blue LEDs to provide the opportunity to alter the light frequency encoding to a different data channel. In one example, data files of at least 256K have been transmitted up to 10 meters through turbid water with minimal data loss. This data point is not limiting but is illustrative. Data files may be transmitted more than 10 meters with minimal data loss. The system as described herein may be to retrofit pre-existing LED lighting systems to allow for simple interactive functional commands between lights. These commands can be read by a computing device in proximity to the LEDs. Alternatively, the commands can be transmitted remotely via wireless communication channels.

The controller 56a is electronically coupled to the transmitter 52a and the receiver 54a. The power source 58a supplies power to the controller 56a, the transmitter 52a, and the receiver 54a. The controller 56a may include an encoder 57a and a modulator-demodulator 59a (and/or demodulator-modulator 59*a*). The controller 56*a* may include signal processing instructions, firmware, communication protocols, and/or other applications that operate signal transmission between the transmitter 52*a* and the receiver 54*a* and between different communication assemblies. The communication assembly 50*a* may include a plurality of transmitters 52*a*, receivers 54*a*, power sources 58*a*, and/or communication assembly controllers 56*a*. Furthermore, the transmitter 52*a* and receiver 54*a* can be configured as a transceiver, a transmitter-receiver, or any other device for processing input and output signals. In such an example, the transmitter is configured to switch the light source on and off in order to generate a signal having encoding therein data.

The first VLC assembly 50*a* includes a power source 58*a*. A number of different power sources 58*a* may be used. For instance, the power source 58*a* can be batteries or power generators. For example, the power generators can be flutter type that include a body configured to oscillate or move in response to fluid flow and generate a voltage based on said oscillations. In another example, the power generator can be a body with an inner surface, an outer surface, a winding at least partially disposed along the outer surface, a passage, and a moveable element disposed in the passage and moveable relative to the body so as to generate a voltage in response to fluid flow through the body.

The second visual light communication (VLC) assembly 50*b* includes a light transmitter 52*b*, a light sensor-receiver 54*b*, a communication assembly controller 56*b*, and a power source 58*b*. The light transmitter 52*b* may communicate with a sensor receiver 54*b* and with a sensor-receiver 54*a* in the first VLC assembly 50*a*. The light transmitter 52*b* can be an LED on one side of a water gap W and the sensor-receiver 54*a* can be a photo diode on the other side of a water gap W. The controller 56*b* is electronically coupled to the transmitter 52*b* and the receiver 54*b*. The power source 58*b* supplies power to the controller 56*b*, the transmitter 52*b*, and the receiver 54*b*. The controller 56*b* may include an encoder 57*b* and a modulator-demodulator 59*b* (and/or demodulator-modulator 59*b*). The controller 56*b* may include signal processing instructions, firmware, communication protocols, and/or other applications that operate signal transmission between the transmitter 52*b* and the receiver 54*b* and between with other communication assemblies 50*a*. The second VLC assembly 50*b* may include a plurality of transmitters 52*b*, receivers 54*b*, power sources 58*b*, and/or communication assembly controllers 56*a*. Furthermore, the transmitter 52*b* and receiver 54*b* can be configured as transceiver, a transmitter-receiver, or any other device for processing input and output signals. In such an example, the transmitter is configured to switch the light source on and off in order to generate a signal having encoding therein data.

The second VLC assembly 50*b* includes a power source 58*b*. The power source 58*b* can be batteries or power generators. For example, the power generators can be be-flutter type that include body configured to oscillate or move in response to fluid flow and generate a voltage based on said oscillations. In another example, the power generator can be a body with an inner surface, an outer surface, winding at least partially disposed along the outer surface, a passage, a moveable element disposed in the passage and moveable relative to the body so as to generator a voltage in response to fluid flow through the body.

Continuing with FIG. 5, in operation data is transmitted via a light transmitter 52*a* into pool water W in the form of a light signal S1. The light signal S1 passes through an optional lens (not shown) covering into the water W until it reaches anther optional lens (not shown) covering the sensor-receiver 54*b* in the second VLC assembly 50*b*. The received light signal is converted back into data and sent to the communications hub 40 and relayed to the computing device 20 for further processing. Furthermore, data may be transmitted via a light transmitter 52*b* of the second VLC assembly 50*b* in the form a light signal S2 to the sensor-receiver 54*a* of the first VLC assembly 50*a*. The received light signal S2 is converted back into data and sent to the communications hub 40 and relayed to the computing device 20 for further processing. The light transmitters 52*a* and 52*b* and sensor-receivers 54*a* and 54*b* can be communication with each other. Furthermore, each light transmitter 52*a*, 52*b*, . . . 52*n* may be configured to emit a signal at a defined transmission angle. Each sensor-receiver 54*a*, 54*b*, . . . 54*n* may be configured to emit a signal at a defined transmission angle that is wider than the transmission angle of the light transmitter 52*a*, 52*b*, . . . 52*n*. This feature can maximize the ability of multiple sensor-receivers to capture a light signal regardless of the alignment of the light transmitter and the sensor-receiver within the water gap W.

Figure 6:
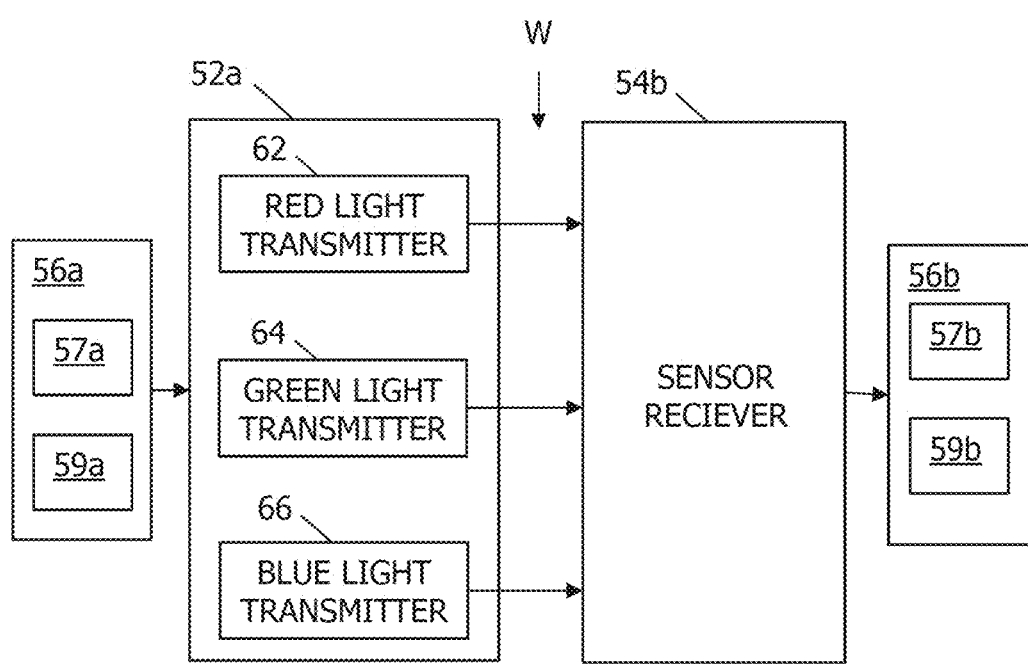
FIGS. 6 and 7 are schematic diagrams of a portion of the VLC communication system illustrating different signal paths.
Figure 7:
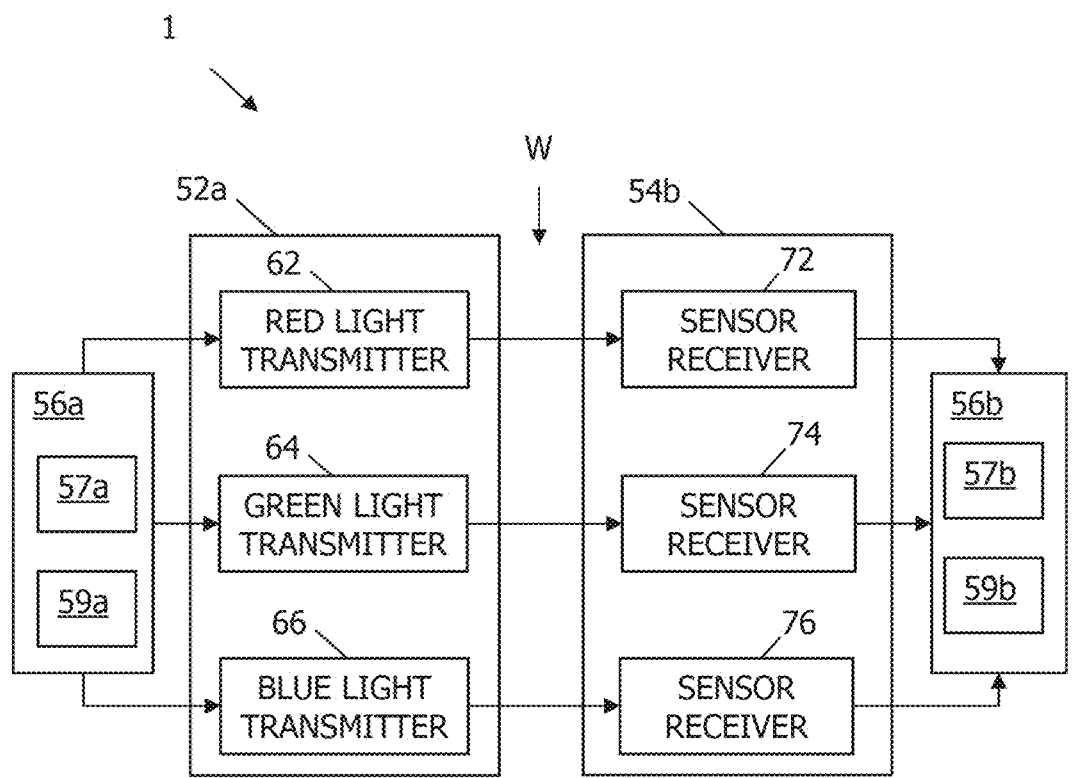

FIGS. 6 and 7 illustrate alternative configurations for implementing visual light communications in a pool environment. In the illustrated embodiment FIG. 6, data is encoded and modulated via the controller 56*a* before being sent to light transmitter 52*a*. Furthermore, the light transmitter 52*a* may have different color transmitters, such as a red transmitter 62, a green light transmitter 64, and a blue light transmitter 66. The signal is received by the sensor-receiver 54*b* in FIG. 6. The signal is then decoded and demodulated in controller 56*b*. Alternatively, as shown in FIG. 7, each sensor-receiver 54*b* has sensors 72, 74, and 76 that correspond to the different light transmitters 62, 64, and 66. The data can be encoded and modulated via the controller 56*a* and then split among the different light transmitters 62, 64, and 66 as shown in FIG. 6. Alternatively, the signal can be parsed into groups before being encoded and modulated. Upon receiving the signal by the sensor receiver 54*b*, the signal may be demodulated and decoded via controller 56*b*. Each signal group is then transmitted from a separate light transmitter. Accordingly, the sensor-receivers receive each signal group and decode and demodulate each group separately before re-combining the groups together to re-form the entirety of the transmitted information.

The VLC communication assemblies described here are configured as send-receive assembles. Each send-receive assembly, or VLC assembly, therefore includes the at least one light transmitter and at least one sensor. Each VLC assembly is configured to A) transmit a respective transmitted light signal, and B) receive a respective one of the transmitted light signals from a different one of the plurality of send-receive assemblies. The VLC assembly may be disposed along one or more of the pool system components. Alternatively, the VLC assembly may include a light transmitter and another VLC assembly may include a sensor-receiver such that individual VLC assemblies are configured for send functions or received functions.

Figure 8:
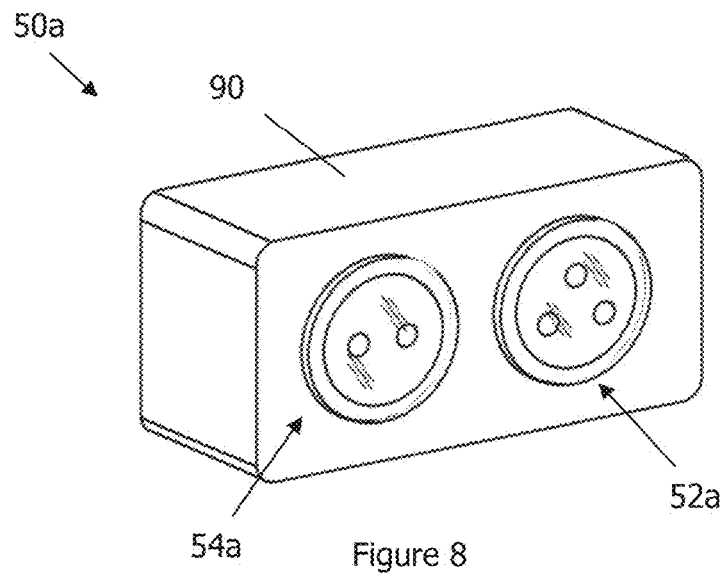
FIG. 8 is a perspective view of a VLC assembly according to an embodiment of the present disclosure.
Figure 9:
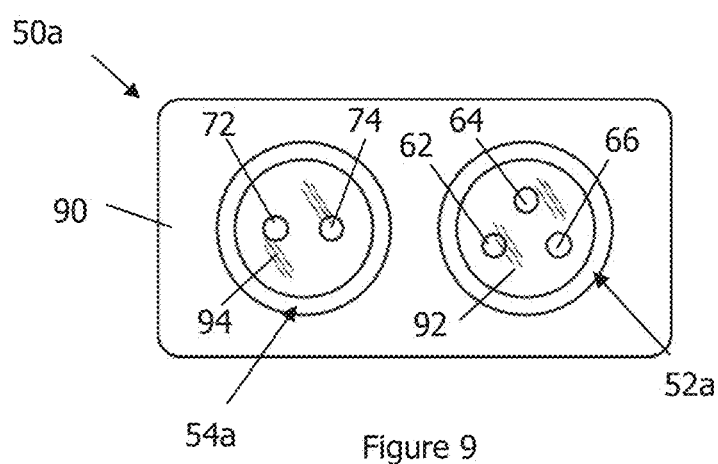
FIG. 9 is a front view of the VLC assembly shown in FIG. 8.
Figure 10:
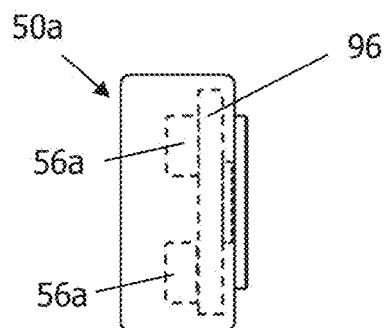
FIG. 10 illustrates a side view of the VLC assembly shown in FIGS. 8 and 9.

FIGS. 8-10 illustrate an exemplary hardware implementation of the VLC assembly 50*a*, 50*b*. The VLC assembly 50*a* may include a housing 90 having a first portal 92 that contains the transmitter 52*a* and a second portal 94 for the sensor-receiver 54*a*. The light transmitters 52*a* may include a red transmitter 62, a green light transmitter 64, and a blue light transmitter 66, and a lens 92. The sensor-receiver 54*a* includes multiple photo-diodes and a lens 94. Within the housing 90 is a PCB 96 including circuitry, the controller 56a, and power source 58a. The housing 90 may be adapted to couple to a pool system component, such as return line or nozzle and the like.

Figure 11:
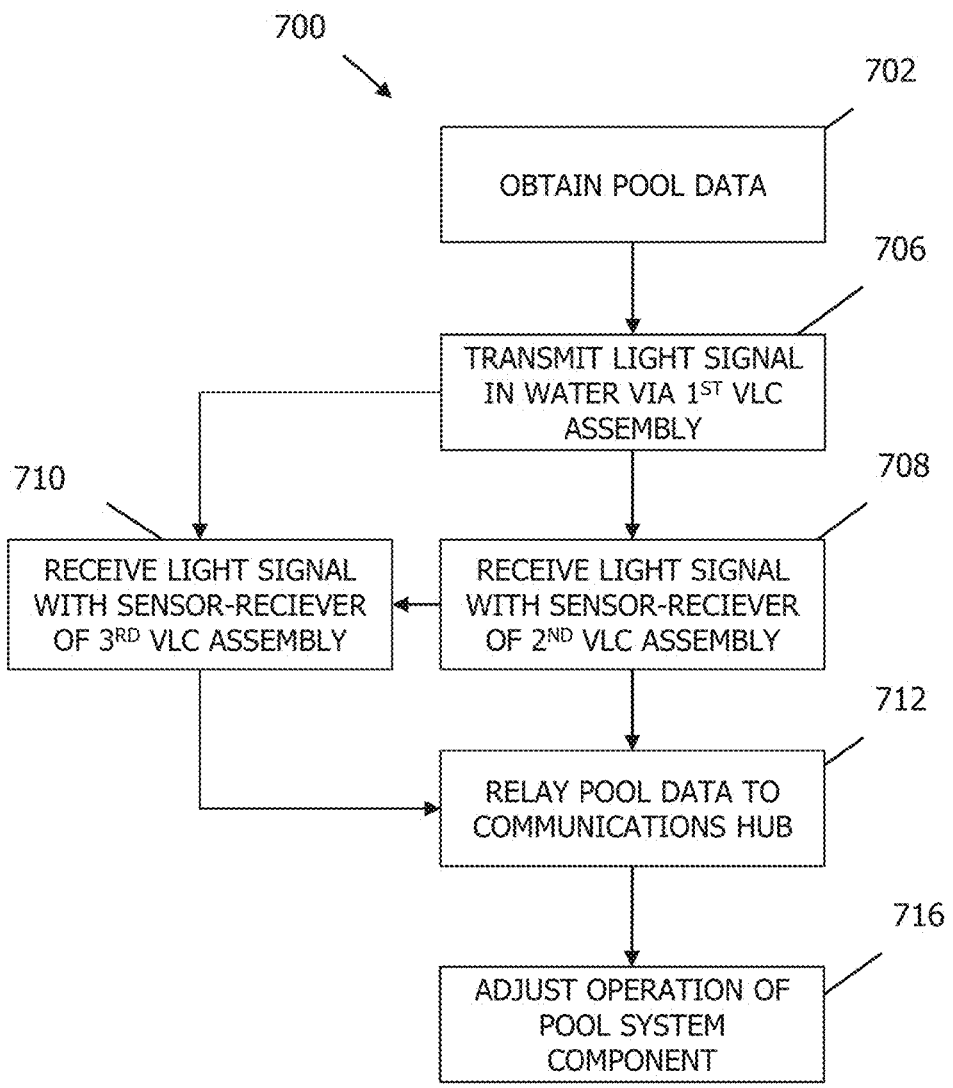
FIG. 11 is a process flow diagram illustrating a method for monitoring and controlling the pool system using the VLC system according to an embodiment of the present disclosure.

FIG. 11 illustrates a method 700 of using the visual light communication among one or more pool components. The method 700 may be implemented using computing device 20 and one or more VLC assemblies 50a, 50b . . . 50n. As shown in FIG. 11, in step 702, pool data is obtained for example via sensor or other monitoring device. In step 706, the light transmitter 52a transmits the light signal within pool water. Step 706 may include signal processing, such as encoding and modulation of the data into the light signal. In step 708, the sensor-receiver 54b of a second VLC assembly, also submerged in water, receives the transmitted light signal through the pool water. However, in step 710, the signal transmitted in step 706 may be received by multiple VLC assemblies. In step 712, the transmitted light signal can be relayed to the communications hub 40. The communications hub 40 may include a receiver submerged in water so as to receive signals from the VLC assemblies 50a, 50b under water. Other components of the communications hub 40 relay the pool data to the computing device 20. Accordingly, methods described herein are suitable for communication from an underwater communication to a location that is external to the pool water, as described above. Examples include, but are not limited to, direct water-to-air communication, and/or indirect water-to-air communication. The system may include a VLC system as described above and one or other communications systems or protocols to enable data collected within the pool to be transmitted to a computing device external to the pool. Furthermore, the systems as described herein can be used to transmit inputs, commands, or control instructions from a computing device external to the pool system to parts of the VLC system and/or a computing device associated with the VLC and the pool components. Accordingly, for signals traveling between two non-similar fluids, the transmission is not hindered.

The VLC assemblies in method 700 may transmit data at different speeds. In one embodiment, uploading and processing a signal using VLC creates no significant lag, resulting in substantially instantaneous transmission and analysis. In a further embodiment, uploading and processing analog or digital signaling using indirect VLC and adaptive modulation may incur a time lag, thus not being substantially instantaneous. An advantage of such an embodiment is use in data transmission that is not highly time-dependent. This may decrease costs associated with using such an embodiment, for example manufacturing costs, installation costs, and operation costs. Such an embodiment may be well-suited for use in swimming pools or similar environments.

Continuing with FIG. 11, in step 716, the computing device 20 can adjust operation of a pool system component. For instance, step 716 may include causing, via the computing device, a mechanical or electrical action of at least one of the plurality of pool components in response to information encoded in the transmitted light signal. A mechanical response may be movement or transition of a state of one or more pool components. Electrical responses may include processing, powering up, powering down, etc.

Figure 12:
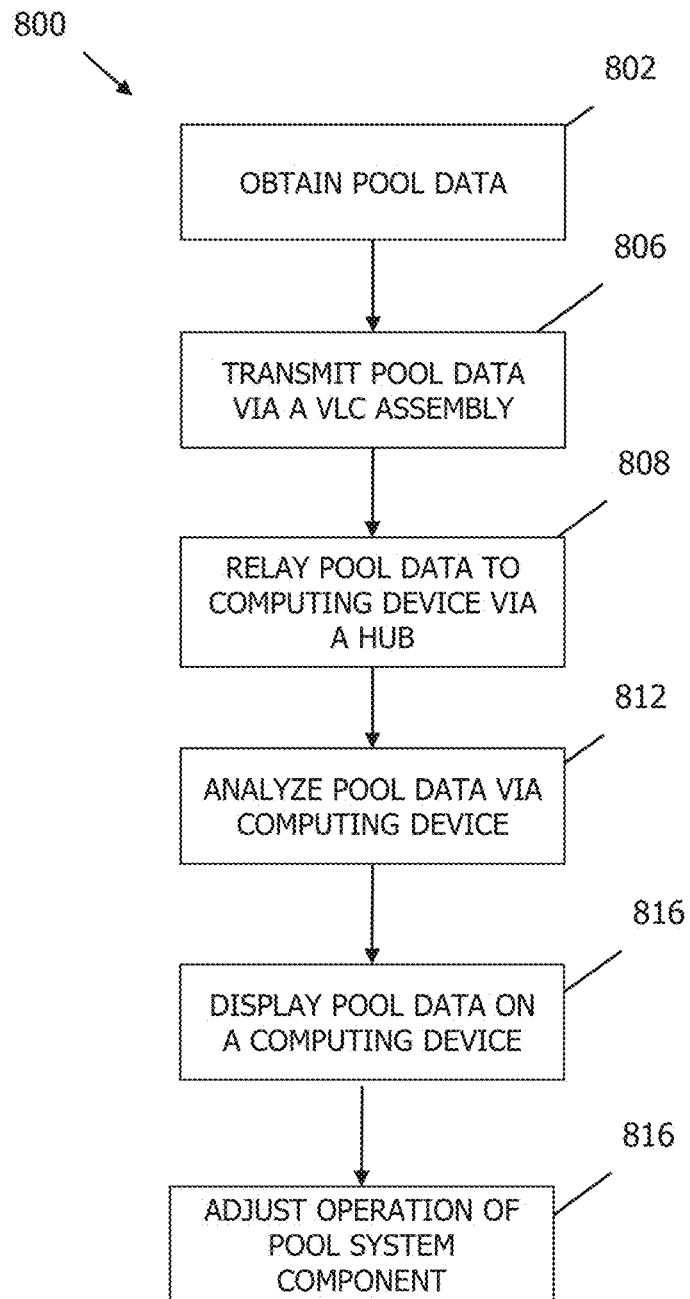
FIG. 12 is a process flow diagram illustrating a method for monitoring and controlling the pool system using the VLC system according to another embodiment of the present disclosure.

Embodiments of the present disclosure are suitable for controlling operation or monitoring the state of one or more pool components of a pool system. An exemplary method 800 for monitoring and controlling a pool system is shown in FIG. 12. The pool components may include, but are not limited to, a water pump, return lines, return fitting, return jets, pool filter, motor, skimmer, and pool lighting, a chemistry analyzer. Embodiments of the present disclosure include a system that has the ability to communicate certain data regarding conditions including, but not limited to, temperature, chemistries, flow rates, and pressures. An embodiment may also be configured to initiate and transmit commands to control different aspects of the pool system environment, including, but not limited to, fluid circulation, lighting, and chemical balancing.

Referring to FIG. 12, step 802 of the method 800 includes obtaining data for one or more of the pool system components. Step 806 includes transmitting pool data via a VLC assembly, at least a portion of which is in pool water. Step 808 includes transmitting the compiled information concerning the one or more of the pool system components to a computing device. The method can further include in step 812 analyzing the information concerning the one or more pool system components. Step 816 includes displaying the information concerning one or more of the pool system components on a user interface running on the computing device. In step 816, the computing device 20 can adjust operation of a pool system component in response to an instruction from the computing device to alter the state the pool system component.

Figure 13:
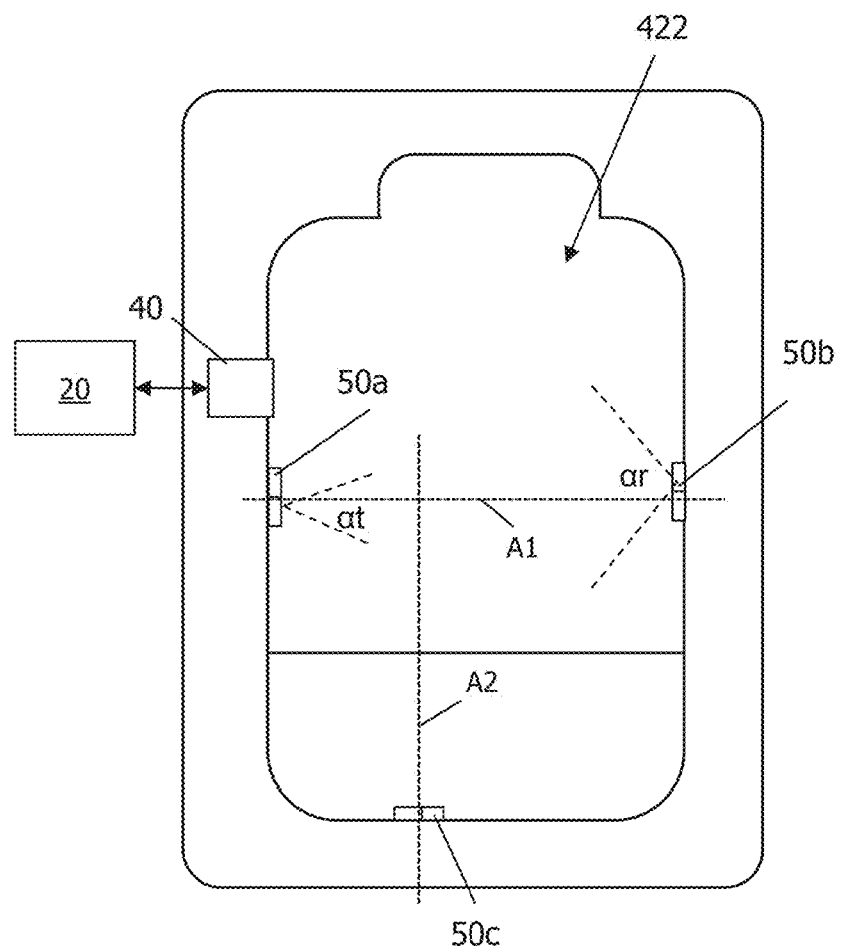
FIG. 13 is a schematic illustrating transmission of pool data among multiple VLC assemblies.

Referring to FIG. 13, embodiments of the present disclosure have VLC assemblies with functionality that allows for receiving and processing signals within water in a variety of pool layouts and configurations. The VLC assemblies are configured to transmit, receive, and analyze data from refracted or scattered light. n advantage of such an embodiment is that the light transmitter can be directed at the sensor-receiver at larger angles. For instance, as illustrated in FIG. 13, a light transmitter of a first VLC assembly 50a can be positioned along a common axis A1 that is directly across from a sensor-receiver of the second VCL assembly 50b. The light transmitter 52a of first VLC assembly 50a can be positioned at location that is offset from the sensor-receiver of a third VLC assembly 50c aligned along an axis A2. Furthermore, each light transmitter 52a, 52b, . . . 52n may be configured to emit a signal at a defined transmission angle α. Each sensor-receiver 54a, 54b, . . . 54n may be configured to emit a signal at a defined transmission angle αr that is wider than the transmission angle αt of the light transmitter 52a, 52b, . . . 52n. This feature can maximize the ability of multiple sensor-receivers to capture a light signal regardless of the alignment of the light transmitter and the sensor-receiver within the water gap W. Thus, data transmission can occur regardless of whether the light transmitter and the sensor-receiver are positioned along a direct, linear path with respect to each other or if they are not positioned along a direct, linear path.

An embodiment of the present disclosure may have a program or application that allows a user to select which pool component to monitor and control. The program can utilize any suitable method of selecting a pool component or set of pool components. For example, the user may select the desired component from a displayed list or grid of components. The components can be displayed in any suitable layout.

Figure 14:
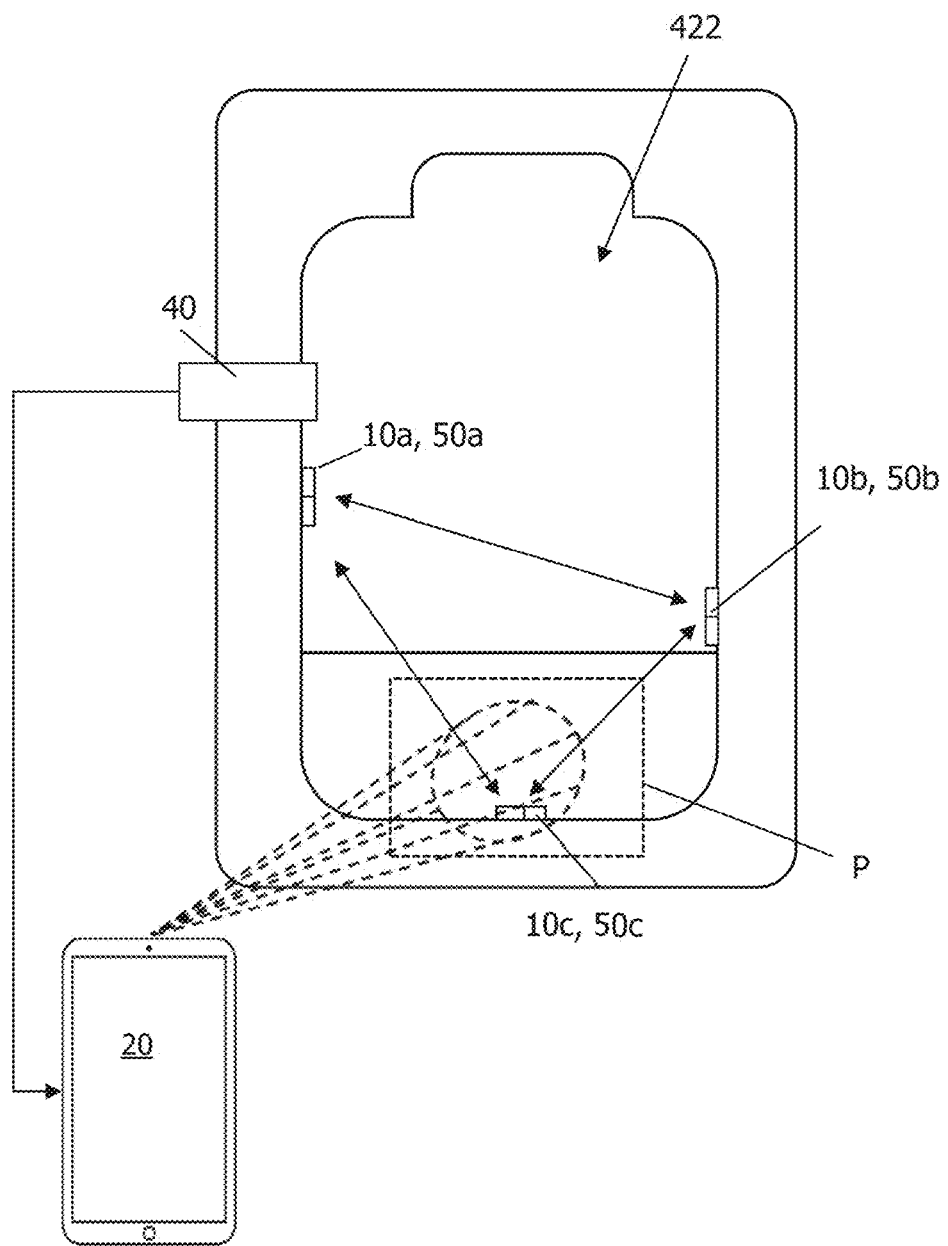
FIG. 14 is a schematic illustrating scanning of a portion of a pool to monitor and control certain pool components.

In one example as shown in FIG. 14, the user may point an imaging device connected to a computing device 40 to a portion P of pool 422. The computing device 422 can then obtain information concerning pool components within that portion P of the pool 422 and display their status on the computing device's user interface. Alternatively, the user can select a pool component based on proximity to the computing device 20 being used. For example, if the computing device 20 is within a predetermined vicinity of the return 10c, the computing device can display the return 10c and status information regarding the return 10c. If the user would like to control operation of the return 10c, the user interface displays control inputs that can be used to control one or more operation of the return 10c. Alternatively, any other acceptable method of selecting a component from a group of components can be utilized in the program or application.

Embodiments of the present disclosure may include a system that can react to changes that occur within the pool environment. Examples of automated control of pool components include, but are not limited to, lighting, heating, surface skimming, pump activation, and drain valve activation. Such a system could react to various stimuli, such as, for example, the presence of users in the pool, the chemical analysis of the water, presence of a foreign object, and other internal or external environmental factors.

Data communication with the use of VLC can be affected by various factors. These factors may include, but are not limited to, light wavelength attenuation and absorption, turbidity of the fluid medium, motion on the surface of the fluid, chemical composition in the fluid and interaction of the chemical components, presence of bubbles or particulates in the medium, transition of the signal from water-to-air or air-to-water, reflection or refraction of light in the fluid, and the maximum range of the light transmitter components. Other factors may include, but are not limited to, placement of light-emitters and light-receivers with respect to one another, internal or external power sources for operating the components, levels of signal noise, conversion of analog-to-digital or digital-to-analog signals, underwater and above water signal processing components, the presence of a time lag in transmitting, receiving and analyzing signals, and external controls (such as computers or smartphones). Embodiments of the present disclosure include different variations intended to address one or more of the above-mentioned factors to facilitate acquisition, processing, and use of pool data.

Embodiments of the present disclosure also include the ability of a pool communication system as described in any of the above embodiments to interact with components already present in the pool system, such as lights, pumps, drains, valves, heaters, vacuums, and all other components common to swimming pool use and maintenance. A further embodiment also has the ability of the pool communication system to interact with external components not within a pool system. For example, the VLC system in a pool may interact with external components in a nearby building or vehicle.

While the foregoing description and drawings represent the various exemplary embodiments of the present disclosure, it will be understood that various additions, modifications, combinations and/or substitutions may be made therein without departing from the spirit and scope of the invention as defined in the accompanying claims. In particular, it will be clear to those skilled in the art that the invention may be embodied in other specific forms, structures, arrangements, proportions, and with other elements, materials, and components, without departing from the spirit or essential characteristics thereof. In addition, features described herein may be used singularly or in combination with other features. For example, features described in connection with one embodiment may be used and/or interchanged with features described in another embodiment. The presently disclosed embodiments are therefore to be considered in all respects as illustrative and not restrictive, the scope of the invention being indicated by the appended claims, and not limited to the foregoing description.

The invention claimed is:

1. A system, comprising:
   a vacuum operable in fluid in a pool and configured to perform a mechanical action;
   a light sensor operable outside or when completely or partially submerged in the fluid of the pool, wherein the light sensor is configured to receive a light signal having encoded therein information concerning operation of the vacuum; and
   a control device electronically coupled to the light sensor, the control device having a processor and a memory unit including stored thereon instructions, which, when executed by the processor, converts the light signal into an electronic signal, which, in turn, is configured to cause at least a mechanical action of the vacuum in response to the information encoded in the electronic signal.

2. The system of claim 1, wherein the light sensor is a photodiode.

3. The system of claim 1, wherein a light transmitter is a light emitting diode.

4. The system of claim 1, wherein the control device is configured to react to changes that occur within an environment of the pool.

5. The system of claim 1, further comprising a control device coupled to the light sensor and configured to control operation of the light sensor.

6. The system of claim 1, wherein an action of the vacuum is automated in response to information encoded in the electronic signal.

7. The system of claim 1, further comprising a light transmitter configured to transmit the light signal.

8. The system of claim 7, wherein the light transmitter is configured to repeatedly transition between two different configurations in order to generate and transmit a light signal that passes through the fluid.

9. The system of claim 7, further comprising a control device electronically coupled to the light transmitter, and a power source coupled to the light transmitter.

10. The system of claim 7, wherein the light transmitter is operable outside or in the fluid of the pool.

11. The system of claim 1, wherein the light signal is alterable to adjust its frequency.

12. A system, comprising:
   a first communication assembly having a housing with a light transmitter configured to emit a light signal having encoded therein information, a controller electronically coupled to the light transmitter, and a power source;
   a second communication assembly operable when in fluid of a pool, the second communication assembly having a light sensor configured to receive the light signal from the light transmitter, wherein the second communication assembly is operable outside or when completely or partially submerged in fluid of the pool; and
   a pool maintenance system having a processor in communication with the second communication assembly, the processor configured to respond to cause a mechanical action of the pool maintenance system in response to the information encoded in the light signal.

13. The system of claim 12, wherein the light sensor is configured to convert the light signal into an electronic signal having encoded therein information.

14. The system of claim 12, further comprising a control device electronically coupled to the light sensor, the control device including the processor and a memory unit including stored thereon instructions, which, when executed by the processor, converts the light signal into an electronic signal, which, in turn, controls operation of the pool maintenance system based upon the information encoded in the light signal.

15. The system of claim 12, wherein the light transmitter is a light emitting diode.

16. The system of claim 12, wherein the light transmitter is operable outside or in fluid of a pool.

17. The system of claim 12, wherein the light transmitter is configured to transmit data files up to about 10 meters in the fluid.

18. The system of claim 12, wherein the light transmitter is configured to repeatedly transition between two different configurations in order to generate and transmit a light signal that passes through the fluid of the pool.

19. The system of claim 12, wherein the light transmitter is configured to transmit light corresponding to a plurality of wavelengths, wherein light of each wavelength is converted by the light sensor to component data.

20. The system of claim 12, wherein the light sensor is a photodiode.

21. The system of claim 12, wherein the light transmitter is a light emitting diode.

22. The system of claim 12, wherein the control device causes a mechanical action of the pool maintenance system in response to the information encoded in the electronic signal.

23. A system for a pool, comprising:
   a housing with a light transmitter configured to generate a light signal having encoded therein information;
   a pool vacuum operable in fluid in a pool;
   a light sensor operable when at least partially submerged in fluid of the pool, wherein the light sensor is configured to receive the light signal having encoded therein information; and
   a control device electronically coupled to the light sensor, the control device having a processor and a memory unit including stored thereon signal processing instructions, which, when executed by the processor, converts the light signal into an electronic signal, which, in turn, controls operation of the pool vacuum based upon the information encoded in the light signal.

24. The system of claim 23, wherein the light transmitter is a light emitting diode.

25. The system of claim 23, wherein the light transmitter is operable in the fluid of the pool.

26. The system of claim 23, wherein the light transmitter is configured to repeatedly transition between an on configuration where light is produced and an off configuration where no light is produced in order to generate and transmit a light signal that passes through the fluid of the pool.

27. The system of claim 23, wherein the light transmitter is configured to transmit light corresponding to a plurality of wavelengths, wherein light of each wavelength is converted by the light sensor to component data relayed to a unique data channel of the control device.

28. The system of claim 23, wherein the light sensor is a photodiode.

29. The system of claim 23, wherein the light transmitter is a light emitting diode.

30. The system of claim 23, wherein the control device causes a mechanical action of the pool vacuum in response to the information encoded in the electronic signal.

31. A system, comprising:
   a first communication assembly having housing and a light transmitter configured to emit a light signal having encoded therein information, a controller electronically coupled to the light transmitter, and a power source, wherein the controller includes signal processing instructions for the light signal;
   a pool vacuum operable in fluid in a pool;
   a second communication assembly coupled to the pool vacuum and operable in the fluid of the pool, the second communication assembly having a light sensor configured to receive the light signal from the light transmitter, wherein the second communication assembly is operable when completely submerged in fluid of the pool; and
   a control device having a processor configured to cause a mechanical action of the pool vacuum in response to the information encoded in the light signal.

32. The system of claim 31, wherein the second communication assembly includes a controller electronically coupled to the light sensor, wherein the controller of the second communication assembly includes signal processing instructions that process the light signal.

33. The system of claim 31, wherein the light transmitter is a light emitting diode.

34. The system of claim 31, wherein the light transmitter is operable in the fluid of the pool.

35. The system of claim 31, wherein the light transmitter is configured to repeatedly transition between an on configuration where light is produced and an off configuration where no light is produced in order to generate and transmit a light signal that passes through the fluid of the pool.

36. The system of claim 31, wherein the light transmitter is configured to transmit light corresponding to a plurality of wavelengths, wherein light of each wavelength is converted by the light sensor to component data relayed to a unique data channel of the control device.

37. The system of claim 31, wherein the light sensor is a photodiode.

38. The system of claim 31, wherein the light transmitter is a light emitting diode.

* * * * *